United States Patent
Nowak et al.

(10) Patent No.: US 10,836,974 B2
(45) Date of Patent: *Nov. 17, 2020

(54) LOW-ADHESION COATINGS WITH SOLID-STATE LUBRICANTS

(71) Applicant: HRL Laboratories, LLC, Malibu, CA (US)

(72) Inventors: Andrew P. Nowak, Los Angeles, CA (US); Elena Sherman, Culver City, CA (US); Adam F. Gross, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 15/638,340

(22) Filed: Jun. 29, 2017

(65) Prior Publication Data

US 2017/0298286 A1 Oct. 19, 2017

Related U.S. Application Data

(63) Continuation-in-part of application No. 15/073,615, filed on Mar. 17, 2016, now Pat. No. 10,696,917.
(Continued)

(51) Int. Cl.
*C10M 111/04* (2006.01)
*C10M 111/02* (2006.01)
(Continued)

(52) U.S. Cl.
CPC .......... *C10M 111/04* (2013.01); *B05D 5/083* (2013.01); *C08G 18/246* (2013.01);
(Continued)

(58) Field of Classification Search
CPC ............ C10M 169/041; C10M 107/44; C10M 147/04; C10M 125/26; C10M 107/38;
(Continued)

(56) References Cited

U.S. PATENT DOCUMENTS 3,435,003 A  3/1969 Craven
3,810,874 A  5/1974 Mitsch et al.
(Continued)

FOREIGN PATENT DOCUMENTS

EP         1558661 B1    12/2012
KR   20020096921 A  *  12/2002
(Continued)

OTHER PUBLICATIONS

Ashish Vaidya and Manoj K. Chaudhury, "Synthesis and Surface Properties of Environmentally Responsive Segmented Polyurethanes," Journal of Colloid and Interface Science 249, 235-245 (2002).
(Continued)

*Primary Examiner* — Taiwo Oladapo
(74) *Attorney, Agent, or Firm* — O'Connor & Company

(57) ABSTRACT

Some variations provide a low-adhesion coating comprising a continuous matrix containing a first component, a plurality of inclusions containing a second component, and a solid-state lubricant distributed within the coating, wherein one of the first component or the second component is a low-surface-energy polymer, and the other of the first component or the second component is a hygroscopic material. The solid-state lubricant may be selected from graphite, graphene, molybdenum disulfide, tungsten disulfide, hexagonal boron nitride, or poly(tetrafluoroethylene) or other fluoropolymers. The solid-state lubricant particles may be coated with a metal selected from cadmium, lead, tin, zinc, copper, nickel, or alloys containing one or more of these metals. The solid-state lubricant is typically characterized by an average particle size from about 0.1 μm to about 500 μm. The solid-state lubricant is preferably distributed throughout the coating.

21 Claims, 5 Drawing Sheets

Related U.S. Application Data which is a continuation-in-part of application No. 14/829,640, filed on Aug. 19, 2015, now Pat. No. 10,125,227, which is a continuation-in-part of application No. 14/658,188, filed on Mar. 14, 2015, now Pat. No. 10,344,244.

(60) Provisional application No. 62/356,867, filed on Jun. 30, 2016, provisional application No. 61/953,093, filed on Mar. 14, 2014.

(51) Int. Cl.

| | | |
|---|---|---|
| *C10M 171/06* | (2006.01) | |
| *C10M 171/04* | (2006.01) | |
| *B05D 5/08* | (2006.01) | |
| *C10M 103/06* | (2006.01) | |
| *C10M 103/04* | (2006.01) | |
| *C10M 103/02* | (2006.01) | |
| *C08G 81/00* | (2006.01) | |
| *C09D 175/08* | (2006.01) | |
| *C08G 18/75* | (2006.01) | |
| *C10M 107/44* | (2006.01) | |
| *C08G 18/50* | (2006.01) | |
| *C08G 18/24* | (2006.01) | |
| *C10M 107/38* | (2006.01) | |
| C08K 3/30 | (2006.01) | |
| C10N 10/02 | (2006.01) | |
| C10N 10/04 | (2006.01) | |
| C10N 10/08 | (2006.01) | |
| C10N 10/12 | (2006.01) | |
| C10N 10/14 | (2006.01) | |
| C10N 20/04 | (2006.01) | |
| C10N 20/06 | (2006.01) | |
| C10N 20/00 | (2006.01) | |
| C10N 30/06 | (2006.01) | |
| C10N 50/02 | (2006.01) | |
| C10N 50/08 | (2006.01) | |

(52) U.S. Cl.
CPC ....... *C08G 18/5015* (2013.01); *C08G 18/758* (2013.01); *C08G 81/00* (2013.01); *C09D 175/08* (2013.01); *C10M 103/02* (2013.01); *C10M 103/04* (2013.01); *C10M 103/06* (2013.01); *C10M 107/38* (2013.01); *C10M 107/44* (2013.01); *C10M 111/02* (2013.01); *C10M 171/04* (2013.01); *C10M 171/06* (2013.01); C08K 2003/3009 (2013.01); C10M 2201/0413 (2013.01); C10M 2201/053 (2013.01); C10M 2201/0613 (2013.01); C10M 2201/0653 (2013.01); C10M 2201/0663 (2013.01); C10M 2201/082 (2013.01); C10M 2213/0606 (2013.01); C10M 2213/0623 (2013.01); C10M 2215/023 (2013.01); C10M 2217/0453 (2013.01); C10M 2229/051 (2013.01); C10N 2010/02 (2013.01); C10N 2010/04 (2013.01); C10N 2010/08 (2013.01); C10N 2010/12 (2013.01); C10N 2010/14 (2013.01); C10N 2020/04 (2013.01); C10N 2020/06 (2013.01); C10N 2020/061 (2020.05); C10N 2030/06 (2013.01); C10N 2050/02 (2013.01); C10N 2050/08 (2013.01)

(58) Field of Classification Search
CPC .... C10M 2213/0606; C10M 2201/105; C08G 18/5015; C08G 18/758; C08G 81/025; C08G 18/6666; C08G 65/34; C08G 81/00; C09D 175/08
See application file for complete search history.

(56) References Cited

U.S. PATENT DOCUMENTS

| | | |
|---|---|---|
| 3,847,978 A | 11/1974 | Sianesi et al. |
| 4,777,224 A | 10/1988 | Gorzynski et al. |
| 4,956,438 A | 9/1990 | Ruetman et al. |
| 5,032,666 A | 7/1991 | Hu et al. |
| 5,084,315 A | 1/1992 | Karimi et al. |
| 5,189,135 A | 2/1993 | Cozzi et al. |
| 5,290,418 A | 3/1994 | Menchen et al. |
| 5,332,798 A * | 7/1994 | Ferreri ............... C08G 18/10 528/61 |
| 5,589,552 A | 12/1996 | Simeone et al. |
| 5,798,415 A | 8/1998 | Corpart et al. |
| 6,071,564 A | 6/2000 | Marchetti et al. |
| 6,579,835 B2 | 6/2003 | Scicchitano et al. |
| 6,926,937 B2 | 8/2005 | Extrand et al. |
| 6,992,132 B2 | 1/2006 | Trombetta et al. |
| 7,655,310 B2 | 2/2010 | Trombetta |
| 9,136,562 B2 | 9/2015 | Singh et al. |
| 2002/0016267 A1 | 2/2002 | Scicchitano et al. |
| 2003/0229176 A1* | 12/2003 | Trombetta ......... C08G 18/0823 524/589 |
| 2004/0019143 A1 | 1/2004 | Koloski et al. |
| 2005/0164010 A1 | 7/2005 | Trombetta |
| 2006/0189750 A1 | 8/2006 | Maier et al. |
| 2007/0298216 A1 | 12/2007 | Jing et al. |
| 2008/0219944 A1 | 9/2008 | Longo et al. |
| 2009/0312206 A1* | 12/2009 | Miyasaka ............... C21D 7/06 508/154 |
| 2010/0324205 A1 | 12/2010 | Maier et al. |
| 2011/0177987 A1 | 7/2011 | Lenting et al. |
| 2011/0218290 A1 | 9/2011 | Webster et al. |
| 2011/0229750 A1 | 9/2011 | McLellan et al. |
| 2011/0213085 A1 | 11/2011 | Tonelli et al. |
| 2012/0136120 A1 | 2/2012 | Bosman |
| 2012/0164565 A1 | 6/2012 | Qiu |
| 2014/0113144 A1 | 4/2014 | Loth et al. |
| 2014/0127516 A1 | 5/2014 | Wang et al. |
| 2014/0162022 A1 | 6/2014 | Nowak et al. |
| 2015/0158969 A1 | 6/2015 | Nowak |
| 2015/0329453 A1 | 11/2015 | Guarda et al. |
| 2015/0361280 A1 | 12/2015 | Reynolds et al. |
| 2016/0028114 A1 | 1/2016 | Pratt et al. |
| 2016/0201005 A1 | 7/2016 | Nowak et al. |

FOREIGN PATENT DOCUMENTS

| | | |
|---|---|---|
| WO | 1997035919 A1 | 10/1997 |
| WO | 2013158360 A1 | 10/2013 |

OTHER PUBLICATIONS

Siochi et al., "Engineered Surfaces for Mitigation of Insect Residue Adhesion" NF1676L-15481 Sampe 2013; May 6-9, 2013; Long Beach, CA; United States.

Wohl et al., "Evaluation of commercially available materials to mitigate insect residue adhesion on wing leading edge surfaces," Progress in Organic Coatings 76 (2013) 42-50.

Kok et al., "Influence of surface characteristics on insect residue adhesion to aircraft leading edge surfaces," Progress in Organic Coatings 76 (2013) 1567-1575.

Lee et al., "Zwitter-Wettability and Antifogging Coatings with Frost-Resisting Capabilities," ACS Nano 7 (2013) 2172-2185.

Chen et al., "Robust Prototypical Anti-icing Coatings with a Self-lubricating Liquid Water Layer between Ice and Substrate," ACS Appl. Mater. Interfaces 5 (2013) 4026-4030.

Turri et aL, "Waterborne Anionomeric Polyurethane-Ureas from Functionalized Fluoropolyethers," Journal of Applied Polymer Science, vol. 93, 136-144 (2004).

(56) References Cited

OTHER PUBLICATIONS

Dou et al., "Anti-icing Coating with an Aqueous Lubricating Layer," ACS Appl. Mater. Interfaces 2014, 6, 6998-7003.
Wang et al., "Investigation of the role of hydrophilic chain length in amphiphilic perfluoropolyether/poly(ethylene glycol) networks: towards high-performance antifouling coatings," Biofouling vol. 27, No. 10, Nov. 2011, 1139-1150.
Chen et al., "A Thermally Re-mendable Cross-Linked Polymeric Material," Science 295 (5560), 1698-1702, Mar. 1, 2002.
Oster et al., "Photoreduction of Metal Ions by Visible Light," Departmenotf Chemistry, Polytechnic Institute of Brooklyn, 135th National meeting of the American Chemical Society, Nov. 5, 1959.
Wojtecki et al., "Using the dynamic bond to access macroscopically responsive structurally dynamic polymers," Nature Materials vol. 10, Jan. 2011.

\* cited by examiner

FIG. 5

| Sample | 50% Humidity | | 90% Humidity | | % Change in k, 50% to 90% Humidity |
|---|---|---|---|---|---|
| | Sliding Angle (°) | k | Sliding Angle (°) | k | |
| Example 1 | 11 | 0.19 | 15 | 0.27 | 42% |
| Example 2 | 12 | 0.21 | 10 | 0.17 | −19% |
| Example 3 | 9 | 0.16 | 10 | 0.17 | 6% |
| Example 4 | 15 | 0.26 | 11 | 0.20 | −23% |

$k$ = Coefficient of Friction

LOW-ADHESION COATINGS WITH SOLID-STATE LUBRICANTS

PRIORITY DATA

This patent application claims priority to U.S. Provisional Patent App. No. 62/356,867, filed on Jun. 30, 2016, which is hereby incorporated by reference herein. This patent application is also a continuation-in-part of U.S. patent application Ser. No. 15/073,615, filed on Mar. 17, 2016, which is a continuation-in-part of U.S. patent application Ser. No. 14/829,640, filed on Aug. 19, 2015, which is a continuation-in-part of U.S. patent application Ser. No. 14/658,188, filed on Mar. 14, 2015, each of which is hereby incorporated by reference herein.

FIELD OF THE INVENTION

The present invention generally relates to low-adhesion materials, coatings, and systems.

BACKGROUND OF THE INVENTION

Coatings and materials can become soiled from debris (particles, insects, oils, etc.) impacting the surface. The debris affects airflow over the surface as well as aesthetics and normally is removed by washing. Insect impact residue affects vehicle fuel economy, aesthetics, and operator vision. On aircraft, insect residue interferes with airflow over a surface, increasing drag and thus fuel consumption. On automobiles, the light dispersion of headlights, operator vision through the windshield, and aesthetic appeal are degraded from insect remains.

Many solutions to reduce insect debris, such as mechanical scrapers, sacrificial continually released liquid layers, and passive coatings with engineered topology have been flight tested. However, the best-performing liquid layer release systems add a large size and weight penalty while the durability of nanostructured surfaces on aircraft or automobile surfaces is unproven. Attempts to mitigate insect accumulation during the early days of aircraft development included mechanical scrapers, deflectors, traps, in-flight detachable surfaces, in-flight dissolvable surfaces, viscous surface fluids, continuous washing fluids, and suction slots. The results of most of these trials were determined ineffective or impractical for commercial use.

One approach to this problem is to create a passive, self-cleaning surface that removes debris from itself by controlling chemical interactions between the debris and the surface. Passive coatings that reduce insect debris are desirable because they have less parasitic mass and do not require the wiring and energy of active systems. No commercial coating provides sufficient residue reduction.

Recently, Wohl et al., "Evaluation of commercially available materials to mitigate insect residue adhesion on wing leading edge surfaces," *Progress in Organic Coatings* 76 (2013) 42-50 describe work at NASA to create anti-insect adhesion or "bugphobic" surfaces. Wohl et al. tested the effect of organic-based coatings on insect adhesion to surfaces, but the coatings did not fully mitigate the issue. Wohl et al. also describe previously used approaches to reduce bug adhesion such as mechanical scrapers, deflectors, paper and/or other coverings, elastic surfaces, soluble films, and washing the surface continually with fluid.

Superhydrophobic and superoleophobic surfaces create very high contact angles (>150°) between the surface and drops of water and oil, respectively. The high contact angles result in the drops rolling off the surface rather than remaining on the surface. These surfaces do not repel solid foreign matter or vapors of contaminants. Once soiled by impact, debris will remain on the surface and render it ineffective. Also, these surfaces lose function if the nanostructured top surface is scratched.

Enzyme-filled coatings leech out enzymes that dissolve debris on the surface. However, enzymes are quickly depleted and cannot be refilled, rendering this approach impractical.

Kok et al., "Influence of surface characteristics on insect residue adhesion to aircraft leading edge surfaces," *Progress in Organic Coatings* 76 (2013) 1567-1575, describe various polymer, sol-gel, and superhydrophobic coatings tested for reduced insect adhesion after impact. The best-performing materials were high-roughness, superhydrophobic surfaces. However, they did not show that debris could be removed from the superhydrophobic surfaces once insects broke on the surface.

Polymeric materials having low surface energies are widely used for non-stick coatings. These materials are tailored with careful control of their chemical composition (thus surface energy) and mechanical properties. Polymers containing low-energy perfluoropolyethers and perfluoroalkyl groups have been explored for low adhesion and solvent repellency applications. While these low-energy polymers facilitate release of materials adhering to them in both air and water, they do not necessarily provide a lubricated surface to promote clearance of foreign substances. See Vaidya and Chaudhury, "Synthesis and Surface Properties of Environmentally Responsive Segmented Polyurethanes," *Journal of Colloid and Interface Science* 249, 235-245 (2002). A fluorinated polyurethane is described in U.S. Pat. No. 5,332,798 issued Jul. 26, 1994 to Ferreri et al.

Fluoropolymer sheets or treated surfaces have low surface energies and thus low adhesion force between foreign matter and the surface. However, friction between impacting debris and the surface results in the sticking of contaminants.

Fluorofluid-filled surfaces have low adhesion between impacting debris and the surface. However, if any of the fluid is lost, the surface cannot be refilled/renewed once applied on the vehicle, and thus loses its properties (see Wong et al., "Bioinspired self-repairing slippery surfaces with pressure-stable omniphobicity," *Nature* 477, 443-447, 2011). The additional maintenance is highly impractical with real-world automobile and aerospace vehicles.

Coatings and materials can also become contaminated from ice forming on the surface. The debris and ice both affect airflow over the surface, for example. Passive, durable anti-icing coatings have been identified as a need in the aerospace field for many decades. However, previous solutions lacked a required level of performance in ice adhesion reduction, adequate long-term durability, or both of these. Some of the most-effective coatings for reducing ice adhesion are dependent on sacrificial oils or greases that have limited useful lifetimes and require regular reapplication. Currently, durable coatings for exposed areas on fixed wing and rotorcraft (such as the leading edge of the wing or rotorblade) include thermoplastic elastomers bonded to the vehicle surface using a film adhesive or an activated adhesive backing incorporated into the coating itself. However, the prior compositions do not provide any benefit in lowering ice adhesion.

There remains a desire for coatings on aircraft exteriors (and other aerospace-relevant surfaces) in order to passively suppress the growth of ice, in addition to removing debris, near strategic points on the vehicle—such as the rotorblade edge, wing leading edge, or engine inlet. There also exists a need for high-performance coating materials fabricated in a way that preserves coating function during actual use of aerospace structures.

Low-adhesion coatings are useful in both bugphobic and icephobic applications. Low-adhesion coatings are certainly not limited to aerospace-relevant surfaces. Other potential applications include wind turbine blades, automobiles, trucks, trains, ocean-going vessels, electrical power transmission lines, buildings, windows, antennas, filters, instruments, sensors, cameras, satellites, weapon systems, and chemical plant infrastructure (e.g., distillation columns and heat exchangers).

In view of the shortcomings in the art, improved coating materials and systems, and compositions suitable for these systems, are needed. In particular, what is desired commercially is a highly durable, passive, low-adhesion (better lubrication) coating.

SUMMARY OF THE INVENTION

The present invention addresses the aforementioned needs in the art, as will now be summarized and then further described in detail below.

Some variations of the invention provide a low-adhesion composition comprising:

(a) fluoropolymers that are present in the triblock structure:

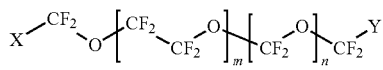

wherein:
X, Y=$CH_2$—(O—$CH_2$—$CH_2$)$_p$-T, and X and Y are independently selected;
p=1 to 50;
T is a hydroxyl or amine terminal group;
m=1 to 100; and
n=1 to 100;

(b) one or more isocyanate species possessing an average isocyanate functionality of about 2 or greater, or a reacted form thereof;

(c) one or more polyol or polyamine chain extenders or crosslinkers possessing an average functionality of about 2 or greater, or a reacted form thereof; and (d) one or more solid-state lubricants distributed throughout the composition.

In some embodiments, the solid-state lubricants are selected from the group consisting of graphite, graphene, molybdenum disulfide, tungsten disulfide, hexagonal boron nitride, poly(tetrafluoroethylene), fluoropolymers, and combinations thereof. In these or other embodiments, the solid-state lubricants are particles having outer surfaces containing (e.g., coated with) a metal selected from the group consisting of cadmium, lead, tin, zinc, copper, nickel, and combinations or alloys thereof.

The solid-state lubricants may have an average particle size from about 0.1 μm to about 500 μm, such as from about 1 μm to about 100 μm.

In some embodiments, the state lubricants are distributed uniformly throughout the composition.

The fluoropolymers may have an average molecular weight from about 500 g/mol to about 20,000 g/mol. In certain embodiments, the fluoropolymers have an average molecular weight from about 1,000 g/mol to about 10,000 g/mol, and/or p is selected from 6 to 50 for each of X and Y, in the molecular triblock structure. The fluoropolymers are preferably (α,ω)-hydroxyl-terminated and/or (α,ω)-amine-terminated.

The isocyanate species may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extenders or crosslinkers may be selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N',N'-tetrakis (2-hydroxypropyl) ethylenediamine, and homologues, derivatives, or combinations thereof.

Following reaction (curing), the composition contains, in a hard segment, the reacted form of the one or more isocyanate species, combined with the reacted form of the one or more polyol or polyamine chain extenders or crosslinkers.

Some variations of the invention provide a low-adhesion coating comprising:

(a) a substantially continuous matrix containing a first component;

(b) a plurality of inclusions containing a second component, wherein the inclusions are dispersed within the matrix; and (c) a solid-state lubricant distributed within the matrix and/or within the inclusions, wherein one of the first component or the second component is a low-surface-energy polymer having a surface energy between about 5 mJ/m$^2$ to about 50 mJ/m$^2$, and the other of the first component or the second component is a hygroscopic material.

In some embodiments, the solid-state lubricant is distributed within the matrix but not within the inclusions. In other embodiments, the solid-state lubricant is distributed within the inclusions but not within the matrix. In preferred embodiments, but without limitation, the solid-state lubricant is distributed throughout the coating.

The solid-state lubricant may be selected from the group consisting of graphite, graphene, molybdenum disulfide, tungsten disulfide, hexagonal boron nitride, poly(tetrafluoroethylene), fluoropolymers, and combinations thereof. In these or other embodiments, the solid-state lubricant is a plurality of particles having outer surfaces containing a metal selected from the group consisting of cadmium, lead, tin, zinc, copper, nickel, and combinations or alloys thereof.

The solid-state lubricant is characterized by an average particle size from about 0.1 μm to about 500 μm.

In certain embodiments, the polymer is a fluoropolymer, such as a fluoropolymer selected from the group consisting of polyfluoroethers, perfluoropolyethers, polyfluoroacrylates, polyfluorosiloxanes, and combinations thereof.

In certain preferred embodiments, the fluoropolymer is perfluoropolyether and the hygroscopic material is poly (ethylene glycol).

The hygroscopic material may be covalently connected to the fluoropolymer in a triblock copolymer, such as:

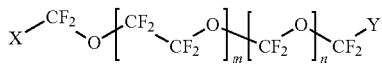

wherein:
X, Y=CH$_2$—(O—CH$_2$—CH$_2$)$_p$-T, and X and Y are independently selected;
p=1 to 50;
T is a hydroxyl or amine terminal group;
m=1 to 100; and
n=1 to 100.

In some embodiments, the hygroscopic material is selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

Following reaction (curing), the continuous matrix contains (i) one or more isocyanate species possessing an average isocyanate functionality of about 2 or greater, or a reacted form thereof; and (ii) one or more polyol or polyamine chain extenders or crosslinkers possessing an average functionality of about 2 or greater, or a reacted form thereof.

The isocyanate species may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extenders or crosslinkers may be selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N',N'-tetrakis (2-hydroxypropyl) ethylenediamine, and homologues, derivatives, or combinations thereof.

The coating optionally also includes one or more additional components selected from the group consisting of a pigment, a dye, a plasticizer, a flame retardant, a flattening agent, and a substrate adhesion promoter, for example.

The low-adhesion coating may be characterized by a coefficient of friction less than 0.5 measured at 50% humidity. In these or other embodiments, the low-adhesion coating is characterized by a coefficient of friction less than 0.3 measured at 90% humidity.

BRIEF DESCRIPTION OF THE DRAWINGS

FIG. 5 is a table of experimental data of coating coefficients of friction at different humidity levels, for Example 5 herein.

DETAILED DESCRIPTION OF EMBODIMENTS OF THE INVENTION

Figure 1:
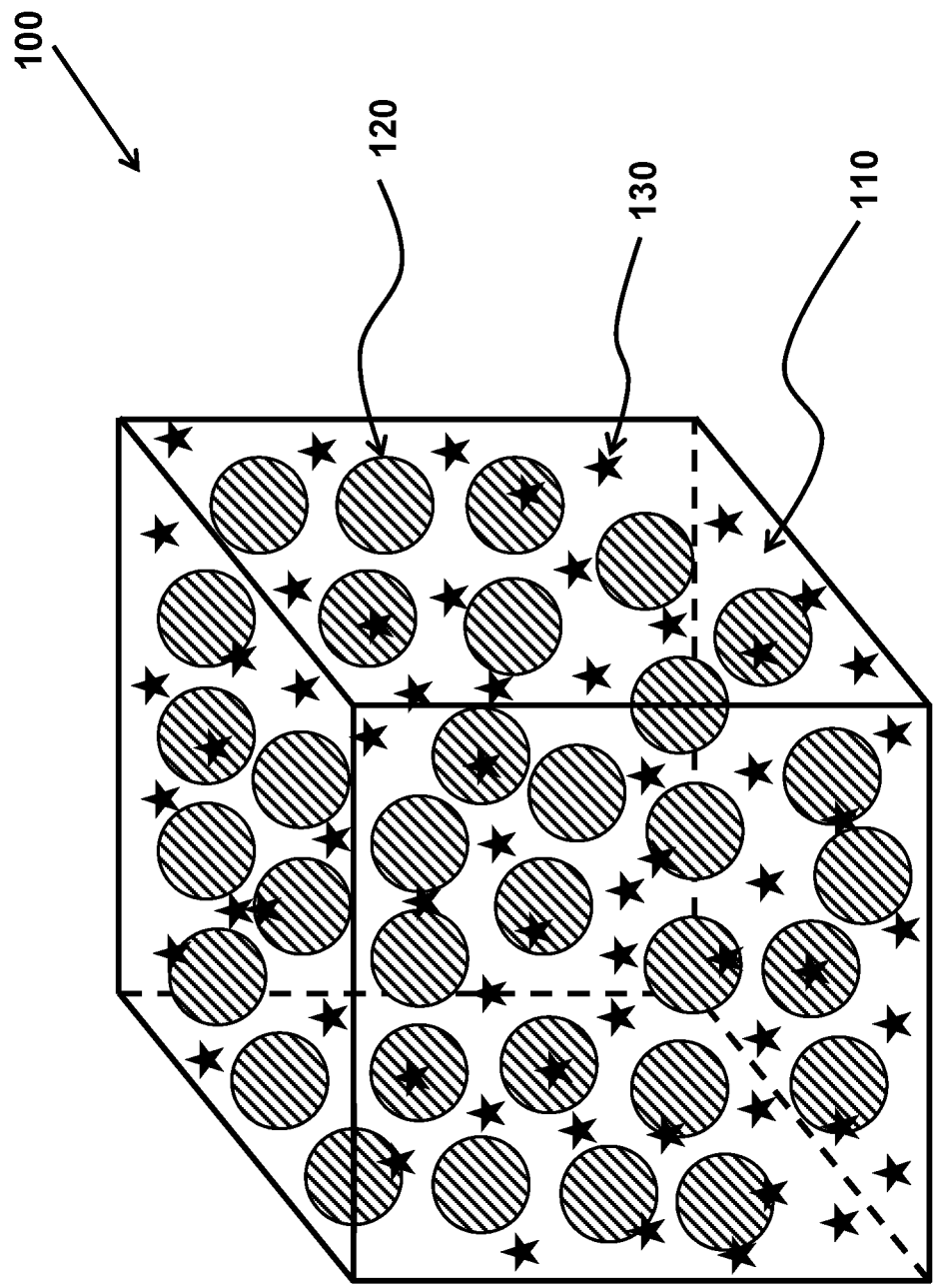
FIG. 1 depicts a structural cross-section of a coating or surface with lubricating properties, in some embodiments of the invention, in which solid-state lubricants are dispersed throughout the material.

The materials, compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

HRL Laboratories' technologies described in U.S. patent application Ser. No. 14/658,188 (filed on Mar. 14, 2015), U.S. patent application Ser. No. 14/829,640 (filed on Aug. 19, 2015), and U.S. patent application Ser. No. 15/073,615 (filed on Mar. 17, 2016) include, among other things, polymeric coating compositions containing fluoropolymer and poly(ethylene glycol) flexible segments that phase-separate to create regions rich in the two respective components on microscopic length scales (such as 0.1-10 µm). These coatings have application potential for bugphobicity due to the fact that they combine non-stick fluoro regions with water-absorbing poly(ethylene glycol) regions that can swell with water and provide lubricity. The combination of non-stick regions and lubrication improves the probability of insects or debris striking the surface and bouncing or sliding off with little to no residue left behind. Certain thermoplastic compositions disclosed in U.S. patent application Ser. No. 14/829,640 have been found to significantly delay the freezing of ice. Certain vulcanized variations disclosed in U.S. patent application Ser. No. 15/073,615 segregate fluoro and water-absorbing elements in discrete block copolymer precursors, for bugphobicity while maintaining good transparency.

This disclosure is premised on the incorporation of solid-state lubricants into the above-mentioned coating compositions, or other coating compositions, to decrease the overall coefficient of friction at the coating surface, while maintaining or improving coating durability. As intended herein, a "solid-state lubricant" means a material that is a solid at a temperature of 25° C. and 1 atm pressure, and that reduces friction of an object or particle that is sliding along the surface of a coating containing the material. For example, the solid-state lubricant aids the sliding of debris (e.g., bug fragments, dirt, ice, etc.) across the surface.

A solid-state lubricant is capable of providing a low overall (coating) coefficient of friction, i.e. improved coating lubricity, while also maintaining or increasing durability. As explained below, lubrication may be developed via moisture in the atmosphere being drawn into hygroscopic components of the coating. In some embodiments of the present disclosure, this moisture-derived lubrication is still present, in addition to the solid-state lubricants that are incorporated into the coating. In fact, there are synergies. The lubricating water can be aided by the solid-state lubricant incorporated into the coating. Certain solid-state lubricants (notably, graphite) work better with moisture present, and thus (without being limited by speculation) may be more effective for lubricity when hygroscopic inclusions are also present in the coating.

Some variations of the invention provide a low-adhesion composition comprising:

(a) fluoropolymers having an average molecular weight from about 500 g/mol to about 20,000 g/mol, wherein the fluoropolymers are (α,ω)-hydroxyl-terminated and/or (α,ω)-amine-terminated, and wherein the fluoropolymers are present in the triblock structure:

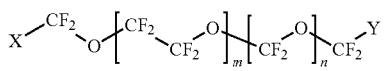

wherein:
X, Y=CH$_2$—(O—CH$_2$—CH$_2$)$_p$-T, and X and Y are independently selected;
p=1 to 50;
T is a hydroxyl or amine terminal group;
m=1 to 100; and
n=1 to 100;

(b) one or more isocyanate species possessing an average isocyanate functionality of about 2 or greater, or a reacted form thereof;

(c) one or more polyol or polyamine chain extenders or crosslinkers possessing an average functionality of about 2 or greater, or a reacted form thereof; and (d) one or more solid-state lubricants distributed throughout the composition.

The solid-state lubricants may be organic, inorganic, or a mixture of organic and inorganic materials.

In some embodiments, the solid-state lubricants are selected from the group consisting of graphite, graphene (single layer or multilayer graphene), molybdenum disulfide, tungsten disulfide, hexagonal boron nitride, poly(tetrafluoroethylene) (PTFE), fluoropolymers, and combinations thereof. Other known solid lubricants include, but are not limited to, talc, calcium fluoride, and cerium fluoride.

Certain embodiments employ solid-state lubricants that do not include poly(tetrafluoroethylene) or other fluoropolymers.

In some embodiments, the solid-state lubricants are particles having outer surfaces containing a metal selected from the group consisting of cadmium, lead, tin, zinc, copper, nickel, and combinations or alloys thereof. Alloys include bronze, brass, and many other possibilities. In some embodiments, particles are coated with one or more metals. The particles that are coated with metal(s) may be made from one of the materials listed above, such as poly(tetrafluoroethylene), or another material, such as silica or alumina. In some embodiments, metallic particles are used, in which the solid-state lubricant particles are made from the selected metal, optionally with other materials present. Hollow metal spheres may also be employed.

In some embodiments, one or more materials selected from graphite, graphene, molybdenum disulfide, tungsten disulfide, hexagonal boron nitride, poly(tetrafluoroethylene), fluoropolymers, or combinations thereof, are employed as a surface coating on base particles, which (when surface-coated) form the solid-state lubricant particles. For example, graphene may be coated onto silica, or a base particle may be surface-functionalized to incorporate fluoropolymers. In certain embodiments, the base particles are actually the inclusions provided within the overall composition. In this case, the inclusions are only partially coated with the lubricating material so that the inclusions can still function as hygroscopic domains or as low-surface-energy domains.

The solid-state lubricants may be characterized by a coefficient of friction from about 0.01 to about 1.0, preferably less than 0.5, more preferably less than 0.3, and most preferably less than 0.2. This is the coefficient of friction of the solid-state lubricant material itself, not the friction coefficient of the overall coating (which is discussed later). An example is graphite, which has a coefficient of friction of about 0.1 (Lide, *CRC Handbook of Chemistry and Physics*, Boca Raton, Fla., CRC Press, 1994, 15-40).

The solid-state lubricants are generally particulates, such as powders. The solid-state lubricants may have an average particle size from about 0.1 µm to about 500 µm, such as from about 1 µm to about 100 µm. In various embodiments, the solid-state lubricants have an average particle size of about, or less than about, 0.1, 0.5, 1, 2, 3, 4, 5, 10, 20, 30, 40, 50, 75, 100, 200, 300, 400, or 500 μm, including all intervening ranges.

In some preferred embodiments, the solid-state lubricants are distributed uniformly throughout the composition. The concentration of solid-state lubricants may vary widely. For example, the solid-state lubricants may be present at a concentration from about 0.1 wt % to about 50 wt %, such as from about 1 wt % to about 20 wt % (based on total weight of coating). In various embodiments, the solid-state lubricants are present at a concentration of about 0.1, 0.5, 1, 2, 3, 4, 5, 6, 7, 8, 9, 10, 15, 20, 25, 30, 35, 40, 45, or 50 wt % (based on total weight of coating).

When the solid-state lubricants are present in only one phase of the coating, such as the hygroscopic phase or the low-surface-energy polymer phase, the solid-state lubricants may be present at a concentration from about 0.1 wt % to about 50 wt %, such as from about 1 wt % to about 20 wt % (based on total weight of the phase). In various embodiments, the solid-state lubricants are present at a concentration of about 0.1, 0.5, 1, 2, 3, 4, 5, 6, 7, 8, 9, 10, 15, 20, 25, 30, 35, 40, 45, or 50 wt % (based on total weight of the phase).

In certain embodiments, the fluoropolymers have an average molecular weight from about 500 g/mol to about 20,000 g/mol, and/or p is selected from 1 to 50 for each of X and Y, in the molecular triblock structure. For example, the fluoropolymers may have an average molecular weight of about 1,000 g/mol, 5,000 g/mol, 10,000 g/mol, or 15,000 g/mol, or an intervening range. The value of p may be selected from 6 to 50, such as from 10 to 20, for each of X and Y. The fluoropolymers are preferably (α,ω)-hydroxyl-terminated and/or (α,ω)-amine-terminated.

The isocyanate species may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extenders or crosslinkers may be selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N',N'-tetrakis (2-hydroxypropyl) ethylenediamine, and homologues, derivatives, or combinations thereof.

Following reaction (curing), the composition contains, in a hard segment, the reacted form of the one or more isocyanate species, combined with the reacted form of the one or more polyol or polyamine chain extenders or crosslinkers.

Some variations of the invention provide a low-adhesion coating comprising:

(a) a substantially continuous matrix containing a first component;

(b) a plurality of inclusions containing a second component, wherein the inclusions are dispersed within the matrix; and (c) a solid-state lubricant distributed within the matrix and/or within the inclusions, wherein one of the first component or the second component is a low-surface-energy polymer having a surface energy between about 5 mJ/m$^2$ to about 50 mJ/m$^2$, and the other of the first component or the second component is a hygroscopic material.

In some embodiments, the solid-state lubricant is distributed within the matrix but not within the inclusions. In other embodiments, the solid-state lubricant is distributed within the inclusions but not within the matrix. In preferred embodiments, but without limitation, the solid-state lubricant is distributed throughout the coating.

The solid-state lubricant may be selected from the group consisting of graphite, graphene, molybdenum disulfide, tungsten disulfide, hexagonal boron nitride, poly(tetrafluoroethylene), fluoropolymers, and combinations thereof. In these or other embodiments, the solid-state lubricant is a plurality of particles having outer surfaces containing a metal selected from the group consisting of cadmium, lead, tin, zinc, copper, nickel, and combinations or alloys (e.g., bronze) thereof. The solid-state lubricant may be characterized by an average particle size from about 10 nm to about 500 μm.

In some embodiments, the surface energy of the low-surface-energy polymer is between about 10 mJ/m$^2$ to about 40 mJ/m$^2$, such as about 10, 15, 20, 25, 30, 35, or 40, mJ/m$^2$. In certain embodiments, the polymer is a fluoropolymer, such as a fluoropolymer selected from the group consisting of polyfluoroethers, perfluoropolyethers, polyfluoroacrylates, polyfluorosiloxanes, and combinations thereof.

In certain preferred embodiments, the fluoropolymer is perfluoropolyether and the hygroscopic material is poly(ethylene glycol).

The hygroscopic material may be covalently connected to the fluoropolymer in a triblock copolymer, such as:

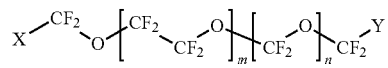

wherein:
X, Y=CH$_2$—(O—CH$_2$—CH$_2$)$_p$-T, and X and Y are independently selected;
p=1 to 50;
T is a hydroxyl or amine terminal group;
m=1 to 100; and
n=1 to 100.

In some embodiments, the hygroscopic material is selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

In certain embodiments, the hygroscopic material is also classified as a hydrophilic material. A hygroscopic substance will actively attract and absorb water. A hydrophilic substance is one where water will preferentially wet the surface, demonstrated by contact angles<90°.

Following reaction (curing), the continuous matrix contains (i) one or more isocyanate species possessing an average isocyanate functionality of about 2 or greater, or a reacted form thereof; and (ii) one or more polyol or polyamine chain extenders or crosslinkers possessing an average functionality of about 2 or greater, or a reacted form thereof.

The isocyanate species may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extenders or crosslinkers may be selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N',N'-tetrakis (2-hydroxypropyl) ethylenediamine, and homologues, derivatives, or combinations thereof.

The coating optionally also includes one or more additional components selected from the group consisting of a pigment, a dye, a plasticizer, a flame retardant, a flattening agent, and a substrate adhesion promoter, for example.

The low-adhesion coating may be characterized by a coefficient of friction less than 0.5, such as from about 0.1 to about 0.4, measured at 50% humidity. In various embodiments, the low-adhesion coating is characterized by a coefficient of friction less than less than 0.30, less than 0.25, or less than 0.20, measured at 50% humidity.

Also, the low-adhesion coating may be characterized by a coefficient of friction less than 0.3, such as from about 0.05 to about 0.25, measured at 90% humidity. In various embodiments, the low-adhesion coating is characterized by a coefficient of friction less than less than 0.25, less than 0.20, or less than 0.15, measured at 90% humidity.

The coefficient of friction of the low-adhesion coating may be measured using, for example, ASTM D1894 ("Standard Test Method for Static and Kinetic Coefficients of Friction of Plastic Film and Sheeting"). The above-recited coefficients of friction may be static friction coefficients, dynamic friction coefficients, or both of these.

Some variations of the invention can be further understood with reference to the drawings of FIGS. 1 to 4. These drawings are not to scale. The top of each figure is presumed to be the surface of the coating, i.e. the surface exposed to environmental conditions.

FIG. 1 depicts a structural cross-section of a coating or surface with lubricating properties, in some embodiments. The structure 100 of FIG. 1 includes a continuous matrix 110. A "continuous matrix" (or equivalently, "substantially continuous matrix") means that the matrix material is present in a form that includes chemical bonds among molecules of the matrix material. An example of such chemical bonds is crosslinking bonds between polymer chains. The structure 100 further includes a plurality of inclusions 120 (depicted as two-dimensional circles for illustration purposes only), intimately dispersed within the matrix 110, each of the inclusions 120 being or comprising a hygroscopic material. In some embodiments, the inclusions 120 are covalently bonded with the matrix 110 in a copolymer, such as the fluoropolymer copolymerized with poly(ethylene glycol). The structure 100 also includes a plurality of solid-state lubricants 130 (depicted as two-dimensional stars for illustration purposes only). In FIG. 1, the solid-state lubricants 130 are distributed uniformly throughout the coating, both within the matrix 110 and within, and/or on the surface of, inclusions 120. The distribution of the solid-state lubricants 130 may be random or ordered.

A random distribution means, with respect to FIG. 1, that the number of solid-state lubricants 130 in any given volume of coating 100 is a random number. An ordered distribution means, with respect to FIG. 1, that the solid-state lubricants 130 in coating 100 are present in a pattern, such as a layered configuration (parallel with surface) of solid-state lubricants 130 within the matrix 110, columns of solid-state lubricants 130 (perpendicular to surface) within the matrix 110, and so on. Also, the distribution of the solid-state lubricants 130 may be uniform or non-uniform.

Figure 2:
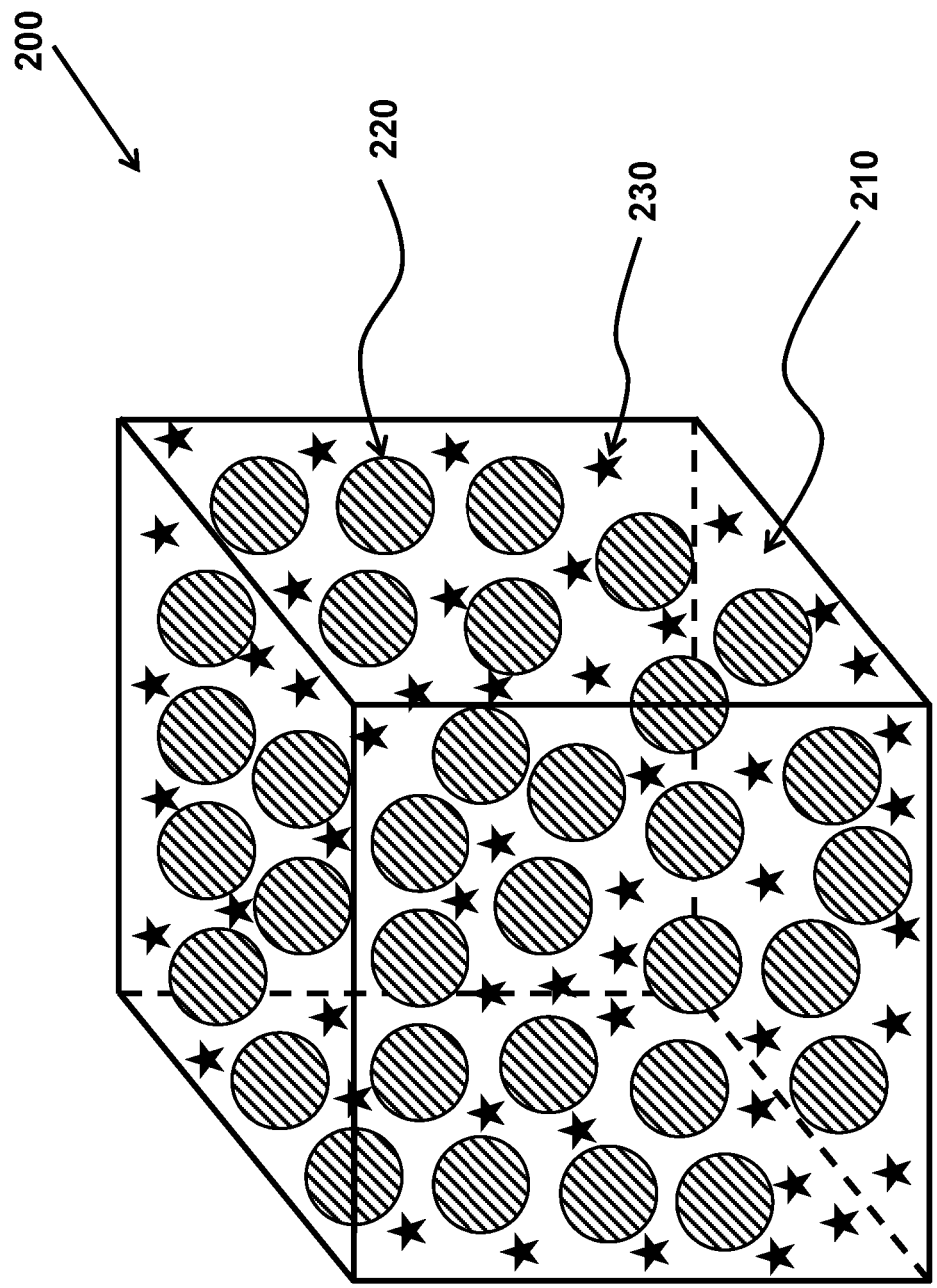
FIG. 2 depicts a structural cross-section of a coating or surface with lubricating properties, in some embodiments of the invention, in which solid-state lubricants are dispersed throughout a continuous matrix but not within inclusions.

FIG. 2 depicts a structural cross-section of a coating or surface with lubricating properties, in some embodiments. The structure 200 of FIG. 2 includes a continuous matrix 210. The structure 200 further includes a plurality of inclusions 220 (depicted as two-dimensional circles for illustration purposes only), intimately dispersed within the matrix 210, each of the inclusions 220 being or comprising a hygroscopic material. The structure 200 also includes a plurality of solid-state lubricants 230 (depicted as two-dimensional stars for illustration purposes only). In FIG. 2, the solid-state lubricants are distributed throughout the matrix 210, but not within or on the surface of the inclusions 220. The distribution of the solid-state lubricants 230 may be random or ordered within the matrix 210.

A random distribution means, with respect to FIG. 2, that the number of solid-state lubricants 230 in any given volume of coating 200 is a random number. An ordered distribution means, with respect to FIG. 2, that the solid-state lubricants 230 in coating 200 are present in a pattern, such as a layered configuration (parallel with surface) of solid-state lubricants 230 within the matrix 210 but not within or on the surface of the inclusions 220, columns of solid-state lubricants 230 (perpendicular to surface) within the matrix 210 but not within or on the surface of the inclusions 220, and so on. In addition, the number of solid-state lubricants 230 in any given region of matrix 210 may be a random number. Also, the distribution of the solid-state lubricants 230 may be uniform or non-uniform.

Figure 3:
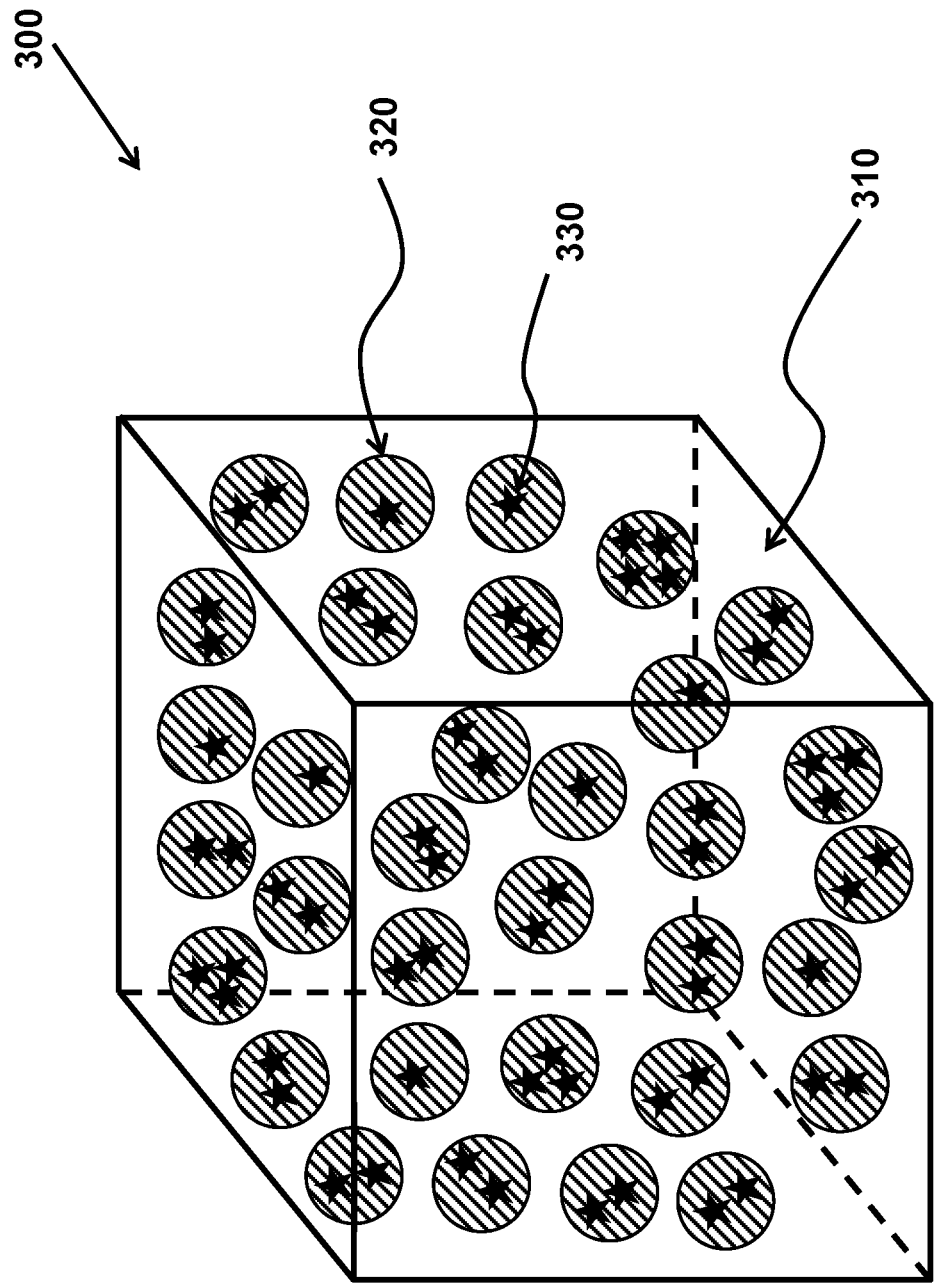
FIG. 3 depicts a structural cross-section of a coating or surface with lubricating properties, in some embodiments of the invention, in which solid-state lubricants are dispersed within inclusions but not the continuous matrix.

FIG. 3 depicts a structural cross-section of a coating or surface with lubricating properties, in some embodiments. The structure 300 of FIG. 3 includes a continuous matrix 310. The structure 300 further includes a plurality of inclusions 320 (depicted as two-dimensional circles for illustration purposes only), intimately dispersed within the matrix 310, each of the inclusions 320 being or comprising a hygroscopic material. The structure 300 also includes a plurality of solid-state lubricants 330 (depicted as two-dimensional stars for illustration purposes only). In FIG. 3, the solid-state lubricants 330 are contained within the inclusions 320, but not within the matrix 310. The distribution of the solid-state lubricants 330 may be random or ordered within each of the inclusions 320.

A random distribution means, with respect to FIG. 3, that the number of solid-state lubricants 330 in any given volume of coating 300 is a random number. An ordered distribution means, with respect to FIG. 3, that the solid-state lubricants 330 in coating 300 are present in a pattern, such as a layered configuration (parallel with surface) of solid-state lubricants 330 within the inclusions 320 but not within the matrix 310, and so on. In addition, the number of solid-state lubricants 330 in any given inclusion 320 may be a random number. Also, the distribution of the solid-state lubricants 330 may be uniform or non-uniform, with respect to the overall coating 300 and/or with respect to an individual inclusion 320. FIG. 3 depicts, for purposes of illustration only, that each inclusion 320 contains from 1 to 3 solid-state lubricants 330. The inclusions 320 may each contain at least 1, 5, 10, 50, 100, 500, or more individual particles of solid-state lubricants 330, for example.

Figure 4:
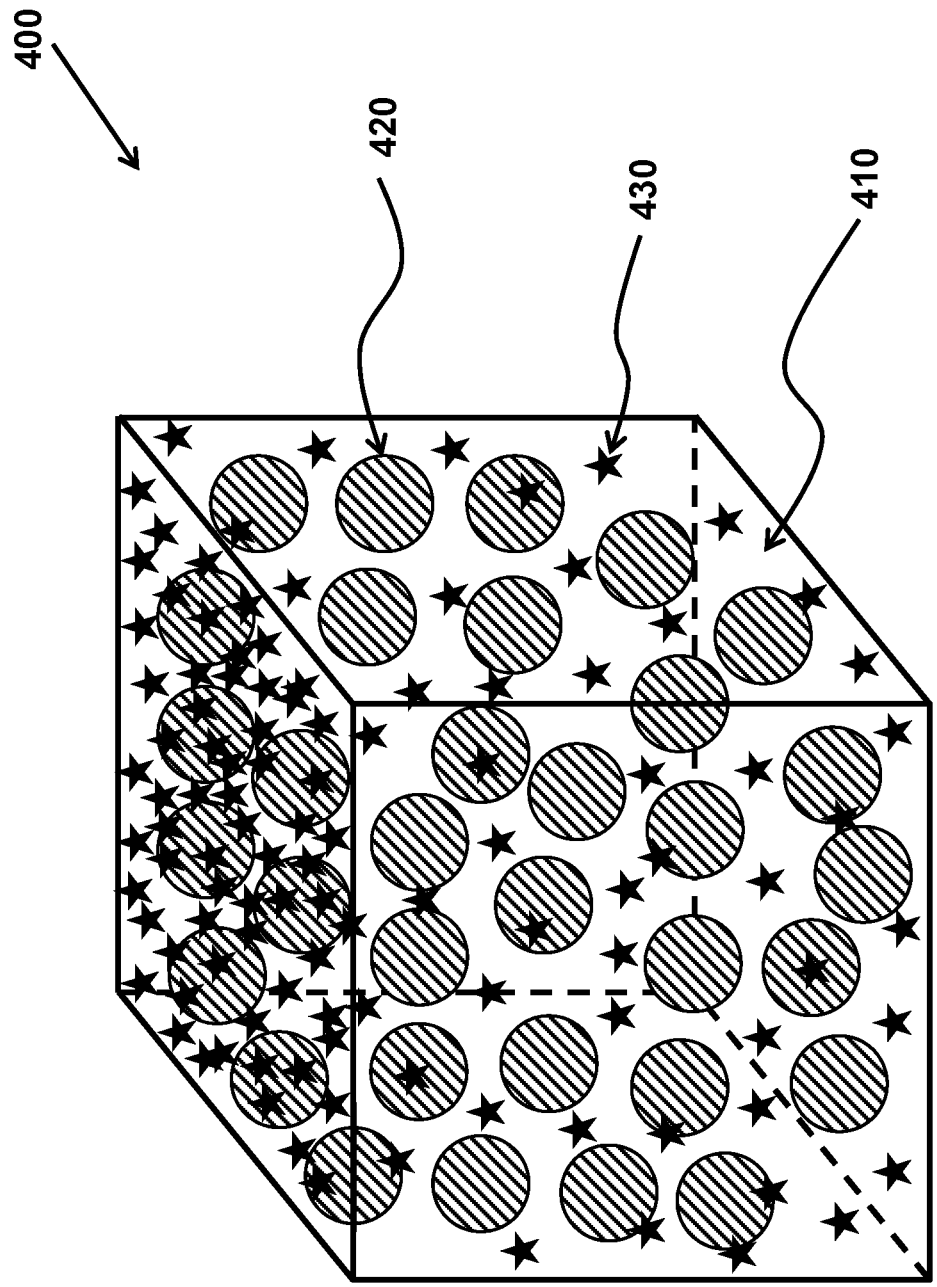
FIG. 4 depicts a structural cross-section of a coating or surface with lubricating properties, in some embodiments of the invention, in which solid-state lubricants are dispersed throughout the material, including a high surface concentration.

FIG. 4 depicts a structural cross-section of a non-uniform coating or surface with lubricating properties, in some embodiments. The structure 400 of FIG. 4 includes a continuous matrix 410. The structure 400 further includes a plurality of inclusions 420 (depicted as two-dimensional circles for illustration purposes only), intimately dispersed within the matrix 410, each of the inclusions 420 being or comprising a hygroscopic material. The structure 400 also includes a plurality of solid-state lubricants 430 (depicted as two-dimensional stars for illustration purposes only). In FIG. 4, the solid-state lubricants 430 are distributed throughout the coating, both within the matrix 410 and within, and/or on the surface of, inclusions 420. In addition, a relatively high concentration of solid-state lubricants 430 is contained at the surface (top of drawing) of the coating 400. The distribution of the solid-state lubricants 430 may otherwise be random or ordered, as described above.

Note that in each of FIGS. 1 to 4, the functions of the continuous matrix 110, 210, 310, and 410 and discrete inclusions 120, 220, 320, and 420 may be reversed. That is, in some variations, the continuous matrix 110, 210, 310, or 410 may be hygroscopic, while the inclusions 120, 220, 320, or 420 may include a low-surface-energy polymer.

In the structures 100, 200, 300, and 400, there may be present various defects, cracks, broken bonds, impurities, additives, and so on. Optionally, the continuous matrix 110, 210, 310, and 410 and/or the inclusions 120, 220, 320, and 420 may further comprise one or more additives selected from the group consisting of fillers, colorants, UV absorbers, defoamers, plasticizers, viscosity modifiers, density modifiers, catalysts, and free-radical scavengers.

Some variations of this invention incorporate a material that possesses both low surface energy (for low adhesion) and the ability to absorb water. A structured material or coating, as disclosed, passively absorbs water from the atmosphere to create a lubrication/self-cleaning layer and to reduce the friction and adhesion of the impacting body (such as an insect) on the surface. The material may be used as a coating or as a surface.

Some embodiments provide combinations of fluorinated and hygroscopic precursors that demonstrate the ability to microphase-separate into discrete islands of fluoropolymer or hygroscopic-rich domains. These systems produce excellent performance in freezing-delay reduction as well as reduced coefficient of friction, especially when coupled with a solid-state lubricant.

The disclosed material, in some embodiments, can absorb water from the atmosphere and use this water as a co-lubricant (along with the solid-state lubricant) to wash and remove debris from the surface. The surface contains domains of a low-surface-energy polymer (such as, but not limited to, a fluoropolymer) providing low adhesion, and microphase-separated domains of a hygroscopic material. Atmospheric water is thus captured as a co-lubricant and is a continually available, renewable resource.

By reducing friction, the debris is less likely to embed in or otherwise attach to the surface and instead will slough off the surface, particularly under the shear forces from air moving over a vehicle surface. Debris may be organic or inorganic and may include insects, dirt, dust, soot, ash, pollutants, particulates, ice, seeds, plant or animal fragments, plant or animal waste products, combinations or derivatives of any of the foregoing, and so on. The coating in some embodiments may be characterized as "bugphobic," which is intended to mean the coating has relatively low adhesion with an impacting bug. Some embodiments provide a durable, insect-debris-reducing coating.

Some variations provide a low-adhesion material that creates a lubricated absorbed water layer on a low-surface-energy coating. This material is formed by coupling hygroscopic and fluorinated materials, which typically repel each other, into a polymer network. By controlling the length scale and amount of these antagonistic chemistries (high/low contact angle and low/high water absorption), the desired low wetting and adhesion of one material (fluorinated component) is coupled with the desired water absorption of the other (hygroscopic material).

This system differs from previous work that relied on purely hydrophilic films to create a liquid water layer on a surface. The hydrophobicity of the coatings provided herein is important for reducing adhesion and wetting of insect debris. Furthermore, this system is different from previous work that relied on trapping non-aqueous fluids on surfaces to lower adhesion. While slippery liquid-infused porous surfaces provide low adhesion from a fluorinated fluid trapped in a porous surface layer, such surfaces cannot extract more fluid from the environment, to counteract fluid loss. In contrast, the hygroscopic component (as disclosed herein) extracts fluid from the environment during (without implying a limitation) rain or frosting, to counteract fluid loss. Generally, as long as there is non-zero humidity present in the atmosphere, or otherwise provided to the coating, the hygroscopic material can absorb at least some water.

In addition, materials provided herein contain large variations in wetting across the surface at <100 μm length scales—arising from low-surface-energy domains closely juxtaposed with high-surface-energy domains. These small length scales are similar to the air-versus-solid variation on known superhydrophobic surfaces exhibiting low insect-impact debris accumulation. In this respect, without being limited by theory, it is noted that although there is no surface roughness, variations in wetting at 1-100 μm length scales (or less) can reduce insect debris adhesion, in some embodiments.

In some variations, low-adhesion structures are created by a heterogeneous microstructure comprising a low-surface-energy polymer that is interspersed with hygroscopic domains (lubricating inclusions). Debris impacting the surface has low adhesion energy with the surface. Due to the presence of the low-surface-energy polymer as well as the solid-state lubricant, the debris will not remain on the surface.

Preferred embodiments employ fluoropolymers, without limitation of the invention, as described in more detail below. One technique to compatibilize fluoropolymers and hygroscopic materials is the use of segmented polyurethane or urea systems. These species demonstrate strong hydrogen bonding potential between them and as a result can create strong associative forces between the chains. In order to produce elastomeric materials, regions of highly flexible and weakly interacting chains (soft segments) must be incorporated with strongly associating elements (hard segments) and this can be provided in a segmented copolymerization scheme. Segmented copolymers provide a straightforward synthetic route toward block architectures using segments with vastly differing properties. Such synthesis results in chains that possess alternating hard and soft segments composed of regions of high urethane bond density and the chosen soft segment component (e.g., fluoropolymer and/or hygroscopic element), respectively. This covalent linkage of dissimilar hard and soft blocks drives the systems to microphase separation and creates regions of flexible soft blocks surrounding regions of hard blocks. The associative forces among the hard segments prevent flow under stress and can produce elastomeric materials capable of displaying high elongation and tensile strength.

In a specific embodiment, a copolymer composition comprises one or more α,ω (alpha, omega)-amine-terminated or α,ω (alpha, omega)-hydroxyl-terminated polyfluoropolymer soft segments having an average molecular weight of between about 500 grams per mole to about 20,000 grams per mole. The exemplary composition optionally further comprises one or more polyethylene glycol second soft segments having an average molecular weight of between about 500 grams per mole to about 10,000 grams per mole. A total content of the soft segments is present in an amount of from about 40% by weight to about 90% by weight, based on a total weight percent of the composition. The composition further comprises one or more hard segments present in an amount of from about 15% by weight to about 50% by weight, based on the total weight percent of the composition, for example. The one or more hard segments comprise a combination of one or more isocyanate species and one or more low-molecular-weight polyol or polyamine chain extenders or crosslinkers.

Certain variations of the invention utilize a copolymer composition comprising:

(a) fluoropolymers having an average molecular weight from about 500 g/mol to about 20,000 g/mol, wherein the fluoropolymers are (α,ω)-hydroxyl-terminated and/or (α,ω)-amine-terminated, and wherein the fluoropolymers are present in the triblock structure:

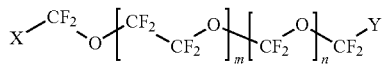

wherein:
X, Y=$CH_2$—(O—$CH_2$—$CH_2$)$_p$-T, and X and Y are independently selected;
p=1 to 50, such as 6 to 50;
T is a hydroxyl or amine terminal group;
m=1 to 100; and
n=1 to 100;

(b) one or more isocyanate species, or a reacted form thereof, possessing an isocyanate functionality of 2 or greater; and (c) one or more polyol or polyamine chain extenders or crosslinkers, or a reacted form thereof.

The X and Y terminal PEG chains may be the same or different. In certain embodiments, X and Y are different. In some of these embodiments, X and Y differ in the terminal group T. For example, X may be terminated with a hydroxyl group and Y may be terminated with an amine group. Or X and Y may be terminated with different types of amine groups. In these or other embodiments, the p value (chain length) may be the same or different between X and Y.

It is also noted that in certain embodiments wherein X has one p value and Y has a different p value, the p value of one of X or Y may be selected from 0 to 50, while the p value of the other of X or Y (on the other end of the fluoropolymer) is selected from 6 to 50. Stated another way, in certain embodiments, X and Y may be selected such that X=$CH_2$— (O—$CH_2$—$CH_2$)$_{p1}$-T and Y=$CH_2$—(O—$CH_2$—$CH_2$)$_{p2}$-T wherein either {p1=6 to 50 and p2=0 to 50} or {p1=0 to 50 and p2=6 to 50}.

Certain variations of the invention utilize a fluoropolymer having an average molecular weight from about 500 g/mol to about 20,000 g/mol, wherein the fluoropolymer is present in the triblock structure:

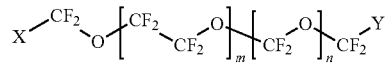

wherein:
X=$CH_2$—(O—$CH_2$—$CH_2$)$_{p1}$-T;
Y=$CH_2$—(O—$CH_2$—$CH_2$)$_{p2}$-T;
X and Y are independently selected and p1 and p2 are independently selected; either {p1=6 to 50 and p2=0 to 50}, or {p1=0 to 50 and p2=6 to 50};
T is a hydroxyl or amine terminal group;
m=1 to 100; and
n=1 to 100.

It is noted that (α,ω)-terminated polymers are terminated at each end of the polymer. The α-termination may be the same or different than the ω-termination. Also it is noted that in this disclosure, "(α,ω)-termination" includes branching at the ends, so that the number of terminations may be greater than 2 per polymer molecule. The polymers herein may be linear or branched, and there may be various terminations and functional groups within the polymer chain, besides the end (α,ω) terminations.

In some embodiments, the fluoropolymers are present in the triblock structure T-($CH_2$—$CH_2$—O)—$CH_2$—$CF_2$—O—($CF_2$—$CF_2$—O)$_m$($CF_2$—O)$_n$—$CF_2$—$CH_2$—(O—$CH_2$—$CH_2$)$_p$-T where T is a hydroxyl or amine terminal group, p=6 to 50, m=1 to 100, and n=1 to 100. Note that the molecular structures depicted in this patent application are not intended to be limiting with respect to bond angles or three-dimensional orientation.

Optionally, the soft-segment phase containing the fluoropolymers, or an additional soft-segment phase, contains one or more second soft segments selected from polyesters or polyethers, wherein the polyesters or polyethers are (α,ω)-hydroxyl-terminated and/or (α,ω)-amine-terminated. When the second soft segments are present, the molar ratio of second soft segments to first soft segments (fluoropolymers) may be less than 2.0, such as about 0.1 to about 1.5. In various embodiments, the molar ratio of the second soft segments to the first soft segments is about 0, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0.

In this description, "polyurethane" is a polymer comprising a chain of organic units joined by carbamate (urethane) links, where "urethane" refers to N(H)—(C=O)—O—. Polyurethanes are generally produced by reacting an isocyanate containing two or more isocyanate groups per molecule with one or more polyols containing on average two or more hydroxyl groups per molecule, in the presence of a catalyst. "Isocyanate" is the functional group with the formula —N=C=O.

Polyols are polymers in their own right and have on average two or more hydroxyl groups per molecule. For example, α,ω-hydroxyl-terminated perfluoropolyether is a type of polyol.

"Polyfluoroether" refers to a class of polymers that contain an ether group—an oxygen atom connected to two alkyl or aryl groups, where at least one hydrogen atom is replaced by a fluorine atom in an alkyl or aryl group.

"Perfluoropolyether" (PFPE) is a highly fluorinated subset of polyfluoroethers, wherein all hydrogen atoms are replaced by fluorine atoms in the alkyl or aryl groups.

"Polyurea" is a polymer comprising a chain of organic units joined by urea links, where "urea" refers to N(H)—(C=O)—N(H)—. Polyureas are generally produced by reacting an isocyanate containing two or more isocyanate groups per molecule with one or more multifunctional amines (e.g., diamines) containing on average two or more amine groups per molecule, in the presence of a catalyst.

A "chain extender or crosslinker" is a compound (or mixture of compounds) that links long molecules together and thereby completes a polymer reaction. Chain extenders or crosslinkers are also known as curing agents, curatives, or hardeners. In polyurethane/urea systems, a curative is typically comprised of hydroxyl-terminated or amine-terminated compounds which react with isocyanate groups present in the mixture. Diols as curatives form urethane linkages, while diamines as curatives form urea linkages. The choice of chain extender or crosslinker may be determined by end groups present on a given prepolymer. In the case of isocyanate end groups, curing can be accomplished through chain extension using multifunctional amines or alcohols, for example. Chain extenders or crosslinkers may have an average functionality greater than 2 (such as 3 or greater), i.e. beyond diols or diamines. In various embodiments, the chain extenders or crosslinkers possess an average functionality of about 2.1, 2.2, 2.3, 2.4, 2.5, 2.6, 2.7, 2.8, 2.9, 3.0, 3.1, 3.2, 3.3, 3.4, 3.5, or more. A functionality of 3 or more is beneficial for vulcanized (highly crosslinked) materials.

The one or more chain extenders or crosslinkers (or reaction products thereof) may be present in a concentration, in the copolymer composition, from about 0.01 wt % to about 10 wt %, such as about 0.05 wt % to about 1 wt %.

As meant herein, a "low-surface-energy polymer" means a polymer, or a polymer-containing material, with a surface energy of no greater than 50 mJ/m². The principles of the invention may be applied to low-surface-energy materials with a surface energy of no greater than 50 mJ/m², in general (i.e., not necessarily limited to polymers).

In some embodiments, the low-surface-energy polymer includes a fluoropolymer, such as (but not limited to) a fluoropolymer selected from the group consisting of polyfluoroethers, perfluoropolyethers, fluoroacrylates, fluorosilicones, and combinations thereof.

In certain embodiments, the low-surface-energy polymer includes a siloxane. A siloxane contains at least one Si—O—Si linkage. The low-surface-energy polymer may consist of polymerized siloxanes or polysiloxanes (also known as silicones). One example is polydimethylsiloxane.

In some embodiments, the fluoropolymers are selected from the group consisting of perfluoropolyethers, polyfluoroacrylates, polyfluorosiloxanes, and combinations thereof. In certain embodiments, the fluoropolymers include a fluoropolymer copolymer with poly(ethylene glycol) having the structure:

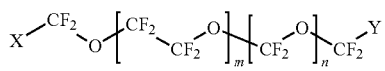

wherein:
X, Y=CH$_2$—(O—CH$_2$—CH$_2$)$_p$-T, and X and Y are independently selected;

p=1 to 50;
T is a hydroxyl or amine terminal group;
m=1 to 100; and
n=1 to 100;

In this structure, one or more F atoms (but less than all F atoms) may be replaced by H atoms or other atoms or groups. For example, without limitation, some of the F atoms that are present in square brackets (i.e., the chains with extents of polymerization m or n) may be replaced with hydrogen atoms, without necessarily impacting the final properties of the fluoropolymer or a copolymer containing it.

When present as second soft segments or within the first soft segments, the polyesters or polyethers may be selected from the group consisting of poly(oxymethylene), poly (ethylene glycol), poly(propylene glycol), poly(tetrahydrofuran), poly(glycolic acid), poly(caprolactone), poly(ethylene adipate), poly(hydroxybutyrate), poly (hydroxyalkanoate), and combinations thereof.

Following a suitable chemical reaction, the copolymer composition contains, in a hard segment, a reacted form of the one or more isocyanate species, combined with a reacted form of the one or more polyol or polyamine chain extenders or crosslinkers. In some embodiments, the hard segment is present in an amount from about 5 wt % to about 60 wt %, based on total weight of the composition.

Note that the functions of the matrix and inclusions may be reversed, such that the matrix provides hygroscopic properties while the inclusions provide low surface energy. In the specific case of a fluoropolymer copolymer with poly(ethylene glycol), the PEG phase may be regarded as the matrix and the fluoropolymer phase may be regarded as the inclusions, depending on the magnitude of m, n, and p values in the copolymer. Large p and small m and n values would tend to make the PEG phase the matrix, while small p values and large m and n values would tend to make the fluoropolymer phase the matrix. When the length scales of inclusions and space between adjacent inclusions are similar, the geometries are arbitrary, and the phases are distinct, it does not really matter which phase is called the matrix.

The inclusions are three-dimensional domains, which may be of any shape, geometry, or aspect ratio. The inclusions may be geometrically symmetric or asymmetric. In some embodiments, the inclusions are anisotropic. As meant herein, "anisotropic" inclusions have at least one chemical or physical property that is directionally dependent. When measured along different axes, an anisotropic inclusion will have some variation in a measurable property. The property may be physical (e.g., geometrical) or chemical in nature, or both.

The inclusions may be characterized as templates, domains, or regions. In some embodiments, the inclusions are phase-separated as discrete, non-continuous regions dispersed in the continuous matrix. In other embodiments, the inclusions are either not phase-separated or are phase-separated at a very small length scale, such as about 20, 10, 5, 4, 3, 2, 1 μm or less (including below the wavelength of light). In some low-adhesion materials, the low-surface-energy polymer and the hygroscopic material are covalently connected in a block copolymer, in which the inclusions and the continuous matrix are distinct phases of the block copolymer. The hygroscopic inclusions may be dispersed uniformly within the continuous matrix. The continuous matrix may form a continuous framework in the coating, in certain embodiments.

As intended herein, a "block copolymer" means a copolymer containing a linear arrangement of blocks, where each block is defined as a portion of a polymer molecule in which the monomeric units have at least one constitutional or configurational feature absent from the adjacent portions. Several types of block copolymers are generally possible, including AB block copolymers, ABA block copolymers, ABC block copolymers, segmented block copolymers, and random copolymers.

A wide range of concentrations of components may be present in the low-adhesion material. For example, the continuous matrix may be from about 5 wt % to about 95 wt %, such as from about 10 wt % to about 50 wt % of the material. The inclusions may be from about 1 wt % to about 90 wt %, such as from about 10 wt % to about 50 wt % of the coating. The solid-state lubricants may be from about 0.1 wt % to about 50 wt % of the coating.

Within the component containing the low-surface-energy polymer, the low-surface-energy polymer may be from about 50 wt % to 100 wt %, such as about 60, 70, 80, 90, 95, or 100 wt %. Within the component containing the hygroscopic material, the hygroscopic material may be from about 50 wt % to 100 wt %, such as about 60, 70, 80, 90, 95, or 100 wt %.

The low-surface-energy polymer and/or the hygroscopic material may be surface-treated, such as to adjust hydrophobicity. The low-adhesion material optionally further contains one or more additional components selected from the group consisting of a filler, a pigment, a dye, a plasticizer, a flame retardant, a flattening agent, and a substrate adhesion promoter.

A filler may be selected from the group consisting of silica, alumina, silicates, talc, aluminosilicates, barium sulfate, mica, diatomite, calcium carbonate, calcium sulfate, carbon, wollastonite, and combinations thereof. The particulate fillers generally are in the size range of about 5 nm to about 10 µm, such as about 20 nm to 2 µm. The filler itself is not the same thing as the solid-state lubricant. The fillers may be surface-modified with a compound selected from the group consisting of fatty acids, silanes, silicones, alkyl phosphonates, alkyl phosphonic acids, alkyl carboxylates, and combinations thereof. Optionally, the fillers may be surface-modified with a hydrophobic material, such as (but not limited to) an alkylsilane, a fluoroalkylsilane, and/or an alkyldisilazane (e.g., hexamethyldisilazane).

In some embodiments, the low-adhesion material further includes voids. As intended herein, a "void" is a discrete region of empty space, or space filled with air or another gas, that is enclosed within the continuous matrix. The voids may be open (e.g., interconnected voids) or closed (isolated within the continuous matrix), or a combination thereof. The voids may partially surround inclusions.

The low-adhesion material may be characterized by a water absorption capacity of at least 10 wt % water based on total weight of the low-adhesion material. The material is characterized, according to some embodiments, by a water absorption capacity of at least 1, 2, 3, 4, 5, 6, 7, 8, or 9 wt % water, preferably at least 10, 11, 12, 13, 14, 15, 16, 17, 18, 19, or 20 wt % water, based on total weight of the material.

The low-adhesion material may be characterized by a surface contact angle of water of greater than 90° (hydrophobic). The material may also be hydrophilic, i.e. characterized by an effective contact angle of water that is less than 90°. In various embodiments, the material is characterized by an effective contact angle of water of about 70°, 75°, 80°, 85°, 90°, 95°, 100°, or higher.

The low-adhesion material may also be lipophobic or partially lipophobic in some embodiments. In various embodiments, the low-adhesion material is characterized by an effective contact angle of hexadecane (as a measure of lipophobicity) of about 50°, 55°, 60°, 65°, 70°, 75°, 80°, 85°, 90°, or higher.

The low-adhesion material may simultaneously have hydrophobic and lipophobic properties. In certain embodiments, the material is characterized by an effective contact angle of water of at least 90° (such as about 95-100°) and simultaneously an effective contact angle of hexadecane of at least 60° (such as about) 65°. In certain embodiments, the low-adhesion material is characterized by an effective contact angle of water of at least 80° (such as about 80-85°) and simultaneously an effective contact angle of hexadecane of at least 70° (such as about 75-80°).

In some embodiments, the low-adhesion material is characterized by a coefficient of friction, measured at 40-55% (e.g. 50%) relative humidity and room temperature, less than 0.9, 0.8, 0.7, 0.6, 0.5, 0.4, 0.3, or 0.2. In these or other embodiments, the low-adhesion material is characterized by a coefficient of friction, measured at 85-90% relative humidity and room temperature, less than 0.7, 0.6, 0.5, 0.4, 0.3, 0.2, or 0.1.

The coefficient of friction is relatively low due to the presence of the solid-state lubricants as well as a lubricating surface layer in the presence of humidity. The specific level of humidity is not regarded as critical, but in general may range from about 1% to 100%, typically about 30% to about 70% relative humidity. Relative humidity is the ratio of the water vapor density (mass per unit volume) to the saturation water vapor density. Relative humidity is approximately the ratio of the actual partial pressure of water vapor to the saturation (maximum) vapor pressure of water in the atmosphere.

In some embodiments, the coating substrate is thus lubricated both by a solid (the solid-state lubricant) as well as by a liquid (water). While the liquid substance that lubricates the substrate is primarily water, it should be noted that other components from the environment may be present in the lubricating surface layer, including oils, metals, dust, dissolved gases, dissolved aqueous components, suspended non-aqueous components, fragments of debris, fragments of polymers, and so on.

In various embodiments, the low-adhesion material is a coating and/or is present at a surface of an object or region. In principle, the low-adhesion material could be present within a bulk region of an object or part, or could contain a temporary, protective laminating film for storage or transport, which is later removed, for example.

Variations of the invention also provide a hardenable precursor material for a low-adhesion material, the precursor material comprising a material capable of forming (i) a substantially continuous matrix containing a first component and (ii) a plurality of phase-separated inclusions containing a second component, wherein one of the first component or the second component is a low-surface-energy polymer having a surface energy between about 5 mJ/m$^2$ to about 50 mJ/m$^2$, and the other of the first component or the second component is a hygroscopic material. In certain embodiments, a precursor material comprises a material capable of forming a substantially continuous matrix, and the precursor material further comprises inclusions, i.e. inclusions that are already formed and dispersed within the precursor material prior to hardening the matrix.

Any known methods to fabricate these materials or coatings may be employed. Notably, these materials or coatings may utilize synthesis methods that enable simultaneous deposition of components or precursor materials to reduce fabrication cost and time. In particular, these materials or coatings may be formed by a one-step process, in some embodiments. In other embodiments, these materials or coatings may be formed by a multiple-step process.

The low-adhesion material, in some embodiments, is formed from a precursor material (or combination of materials) that may be provided, obtained, or fabricated from starting components. The precursor material is capable of hardening or curing in some fashion, to form a substantially continuous matrix along with a plurality of inclusions, dispersed within the matrix. The precursor material may be a liquid; a multiphase liquid; a multiphase slurry, emulsion, or suspension; a gel; or a dissolved solid (in water and/or organic solvent), for example.

The coatings may be waterborne coatings, solventborne coatings, or coatings derived from a precursor dissolved in a solvent that contains both water as well as an organic solvent.

The low-surface-energy polymer and the hygroscopic material may initially be in the same phase or in different phases. In some embodiments, the low-surface-energy polymer is in liquid or dissolved form while the hygroscopic material is in dissolved-solid or suspended solid form. In some embodiments, the low-surface-energy polymer is dissolved-solid or suspended-solid form while the hygroscopic material is in liquid or dissolved form. In some embodiments, the low-surface-energy polymer and the hygroscopic material are both in liquid form. In some embodiments, the low-surface-energy polymer and the hygroscopic material are both in dissolved (solvent) form.

In some variations of the invention, a material or coating precursor is applied to a substrate and allowed to react, cure, or harden to form a final coating, wherein the material, coating precursor, or final coating contains a copolymer composition comprising:

(a) fluoropolymers having an average molecular weight from about 500 g/mol to about 20,000 g/mol, wherein the fluoropolymers are ($\alpha,\omega$)-hydroxyl-terminated and/or ($\alpha,\omega$)-amine-terminated, and wherein the fluoropolymers are present in the triblock structure:

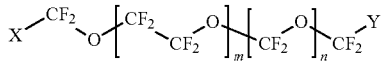

wherein:
X, Y=$CH_2$—(O—$CH_2$—$CH_2$)$_p$-T, and X and Y are independently selected;
p=1 to 50;
T is a hydroxyl or amine terminal group;
m=1 to 100; and
n=1 to 100;

(b) one or more isocyanate species, or a reacted form thereof, possessing an isocyanate functionality of 2 or greater;

(c) one or more polyol or polyamine chain extenders or crosslinkers, or a reacted form thereof; and (d) one or more solid-state lubricants.

In some embodiments, the hygroscopic material is also hardenable, either alone or in combination with the low-surface-energy polymer. For instance, a low-surface-energy polymer and a hygroscopic polymer may form a high-molecular-weight block copolymer and thus harden. In certain embodiments, the hygroscopic material assists in the curability (hardenability) of the low-surface-energy polymer.

In some embodiments, a precursor material is prepared and then dispensed (deposited) over an area of interest. Any known methods to deposit precursor materials may be employed. A fluid precursor material allows for convenient dispensing using spray coating or casting techniques over a large area, such as the scale of a vehicle or aircraft.

The fluid precursor material may be applied to a surface using any coating technique, such as (but not limited to) spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing. Because relatively simple coating processes may be employed, rather than lithography or vacuum-based techniques, the fluid precursor material may be rapidly sprayed or cast in thin layers over large areas (such as multiple square meters).

When a solvent or carrier fluid is present in the fluid precursor material, the solvent or carrier fluid may include one or more compounds selected from the group consisting of water, alcohols (such as methanol, ethanol, isopropanol, or tert-butanol), ketones (such as acetone, methyl ethyl ketone, or methyl isobutyl ketone), hydrocarbons (e.g., toluene), acetates (such as tert-butyl acetate), acids (such as organic acids), bases (such as organic bases), and any mixtures thereof. In principle, inorganic non-aqueous solvents (such as sulfuryl chloride fluoride) may also be employed, in certain embodiments. When a solvent or carrier fluid is present, it may be in a concentration of from about 10 wt % to about 99 wt % or higher, for example.

The precursor material may be converted to an intermediate material or the final material using any one or more of curing or other chemical reactions, or separations such as removal of solvent or carrier fluid, monomer, water, or vapor. Curing refers to toughening or hardening of a polymeric material by cross-linking of polymer chains, assisted by electromagnetic waves, electron beams, heat, and/or chemical additives. Chemical removal may be accomplished by heating/flashing, vacuum extraction, solvent extraction, centrifugation, etc. Physical transformations may also be involved to transfer precursor material into a mold, for example. Additives may be introduced during the hardening process, if desired, to adjust pH, stability, density, viscosity, color, or other properties, for functional, ornamental, safety, or other reasons.

The overall thickness of the final material or coating may be from about 1 μm to about 1 cm or more, such as about 10 μm, 20 μm, 25 μm, 30 μm, 40 μm, 50 μm, 75 μm, 100 μm, 500 μm, 1 mm, 1 cm, or 10 cm. Relatively thick coatings offer good durability and mechanical properties, such as impact resistance, while preferably being relatively lightweight. Domains of low-adhesion material exist throughout the material, in both planar and depth dimensions. The low-adhesion function is retained even after abrasion of the top layer of the material. This creates an environmentally durable coating.

EXAMPLES

Example 1: Baseline Polymer without Solid-State Lubricant 4,4'-Methylenebis (cyclohexyl isocyanate) (HMDI), 1,1,1-tris(hydroxymethyl) propane (TMP), and dibutyltin dilaurate (DBTDL) are purchased from Sigma Aldrich. 5147X PFPE-ethoxylated diol is purchased from Solvay Specialty Polymers.

5147X PFPE-ethoxylated diol (4.5 mmoles, 10.8 g) and HMDI (22.5 mmoles, 5.895 g) are added into a 3-neck flask equipped with a mechanical stirrer. The reaction flask is placed in a 100° C. oil bath. The reaction is carried out under argon. 3.66 mg of DBTDL is added to the mix. The reaction mixture is stirred at 100° C. for 1 hour. The reaction flask is removed from the 100° C. oil bath, and allowed to cool down before adding THF (20 mL) and TMP (12 mmoles, 1.611 g) dissolved in MEK (10 mL). Films are cast as sheets or sprayed on aluminum coupons.

Example 2: Low-Adhesion Polymer with 15.7 Vol % $MoS_2$ 4,4'-Methylenebis (cyclohexyl isocyanate) (HMDI), 1,1,1-tris(hydroxymethyl) propane (TMP), dibutyltin dilaurate (DBTDL), and molybdenum (IV) sulfide are purchased from Sigma Aldrich. 5147X PFPE-ethoxylated diol is purchased from Solvay Specialty Polymers.

5147X PFPE-ethoxylated diol (3 mmoles, 7.2 g) and HMDI (15 mmoles, 3.93 g) are added into a 3-neck flask equipped with a mechanical stirrer. The reaction flask is placed in a 100° C. oil bath. The reaction is carried out under argon. 2.5 mg of DBTDL is added to the mix. The reaction mixture is stirred at 100° C. for 1 hour. The reaction flask is removed from the 100° C. oil bath, and allowed to cool down before adding THF (15 mL) and TMP (8 mmoles, 1.074 g) dissolved in MEK (7 mL). 7 g of $MoS_2$ is added to the prepolymer and mixed well on a FlackTek SpeedMixer. Films are cast as sheets or sprayed on aluminum coupons.

Example 3: Low-Adhesion Polymer with 15.7 Vol % Graphite 4,4'-Methylenebis (cyclohexyl isocyanate) (HMDI), 1,1,1-tris(hydroxymethyl) propane (TMP), and dibutyltin dilaurate (DBTDL) are purchased from Sigma Aldrich. 5147X PFPE-ethoxylated diol is purchased from Solvay Specialty Polymers. CPREME G8 graphite is purchased from ConocoPhillips.

5147X PFPE-ethoxylated diol (3 mmoles, 7.2 g) and HMDI (15 mmoles, 3.93 g) are added into a 3-neck flask equipped with a mechanical stirrer. The reaction flask is placed in a 100° C. oil bath. The reaction is carried out under argon. 2.5 mg of DBTDL is added to the mix. The reaction mixture is stirred at 100° C. for 1 hour. The reaction flask is removed from the 100° C. oil bath, and allowed to cool down before adding THF (15 mL) and TMP (8 mmoles, 1.074 g) dissolved in MEK (7 mL). 3.1 g of graphite is added to the prepolymer and mixed well on a FlackTek SpeedMixer. Films are cast as sheets or sprayed on aluminum coupons.

Example 4: Low-Adhesion Polymer with 30 Vol % Graphite 4,4'-Methylenebis (cyclohexyl isocyanate) (HMDI), 1,1,1-tris(hydroxymethyl) propane (TMP), and dibutyltin dilaurate (DBTDL) are purchased from Sigma Aldrich. 5147X PFPE-ethoxylated diol is purchased from Solvay Specialty Polymers. CPREME G8 graphite is purchased from ConocoPhillips.

5147X PFPE-ethoxylated diol (3 mmoles, 7.2 g) and HMDI (15 mmoles, 3.93 g) are added into a 3-neck flask equipped with a mechanical stirrer. The reaction flask is placed in a 100° C. oil bath. The reaction is carried out under argon. 2.5 mg of DBTDL is added to the mix. The reaction mixture is stirred at 100° C. for 1 hour. The reaction flask is removed from the 100° C. oil bath, and allowed to cool down before adding THF (15 mL) and TMP (8 mmoles, 1.074 g) dissolved in MEK (7 mL). 6 g of graphite is added to the prepolymer and mixed well on a FlackTek SpeedMixer. Films are cast as sheets or sprayed on aluminum coupons.

Example 5: Friction Testing of Example 1-4 Coatings

The change in friction in response to humidity is tested by equilibrating the samples at ambient (40-55%) relative humidity or 90% relative humidity in a humidity-controlled chamber. Then the samples are placed on a variable angle stage and the angle is increased until a 5 g cylindrical mass slides along the sample surface. The sliding angle is used to determine the coefficient of friction. The friction changes as well as contact angles are shown in the table of FIG. 5.

The friction of the Example 1 material increases with humidity, but when lubricants are added (Examples 2-4), the friction increase is much less or the friction even decreases. At high humidity, the friction coefficients for all samples containing solid-state lubricants are lower than the friction coefficient of the Example 1 baseline sample (no solid-state lubricant).

Example 6: Ice Formation Testing of Example 1-4 Coatings

The kinetic delay of freezing is measured by placing three 50 μL drops of deionized water on a surface held at −10° C. with a thermoelectric cooler. The time for ice to initially form in the droplets is measured. While this does not relate directly to friction, understanding how these materials affect ice formation will expand or limit their uses.

The following freezing delays are measured:
Example 1:45±15 s
Example 2: 279±104 s
Example 3: 246±85 s
Example 4: 1163±218 s
Bare 6061 Aluminum: 13±6 s The incorporation of solid-state lubricants decreases ice formation, indicating that the Example 2-4 coatings may be useful in conditions where ice formation is likely.

Practical applications for the present invention include, but are not limited to, aerospace vehicles, windows, optical lenses, filters, instruments, sensors, eyeglasses, cameras, satellites, and weapon systems. For example, automotive applications can utilize these coatings to prevent the formation of debris on back-up camera lenses or back-up sensors. The principles taught herein may also be applied to self-cleaning materials, anti-adhesive coatings, corrosion-free coatings, etc.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A low-adhesion composition containing a solventborne copolymer composition comprising:
   (a) first soft segments comprising fluoropolymers that are present in the triblock structure:

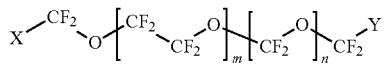

wherein:
X, Y=CH$_2$—(O—CH$_2$—CH$_2$)$_p$-T, and X and Y are independently selected;
p=1 to 50;
T is a hydroxyl or amine terminal group;
m=1 to 100; and
n=1 to 100;
   (b) second soft segments comprising polyesters or polyethers, wherein said polyesters or polyethers are ($\alpha,\omega$)-hydroxyl-terminated and/or ($\alpha,\omega$)-amine-terminated;
   (c) one or more isocyanate species possessing an average isocyanate functionality of about 2 or greater, or a reacted form thereof;
   (d) one or more polyol or polyamine chain extenders or crosslinkers possessing an average functionality of about 2 or greater, or a reacted form thereof, wherein said polyol or polyamine chain extenders or crosslinkers contain hydroxyl-terminated or amine-terminated compounds that are reactive with said isocyanate species; and
   (e) one or more solid-state lubricants distributed throughout said composition, wherein the molar ratio of said second soft segments to said first soft segments is 1.7 or less.

2. The low-adhesion composition of claim 1, wherein said solid-state lubricants are selected from the group consisting of graphite, graphene, molybdenum disulfide, tungsten disulfide, hexagonal boron nitride, poly(tetrafluoroethylene), fluoropolymers, and combinations thereof.

3. The low-adhesion composition of claim 1, wherein said solid-state lubricants are particles coated with a metal selected from the group consisting of cadmium, lead, tin, zinc, copper, nickel, and combinations or alloys thereof.

4. The low-adhesion composition of claim 1, wherein said solid-state lubricants have an average particle size from about 0.1 μm to about 500 μm.

5. The low-adhesion composition of claim 1, wherein said solid-state lubricants are distributed uniformly throughout said composition.

6. The low-adhesion composition of claim 1, wherein said fluoropolymers have an average molecular weight from about 1,000 g/mol to about 10,000 g/mol.

7. The low-adhesion composition of claim 1, wherein p is selected from 6 to 50 for each of X and Y.

8. The low-adhesion composition of claim 1, wherein said isocyanate species are selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

9. The low-adhesion composition of claim 1, wherein said polyol or polyamine chain extenders or crosslinkers are selected from the group consisting of 1,3-butanediol, 1,4-butanediol, 1,3-propanediol, 1,2-ethanediol, di ethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N',N'-tetrakis (2-hydroxypropyl) ethylenediamine, and homologues, derivatives, or combinations thereof.

10. The low-adhesion composition of claim 1, wherein said composition contains, in a hard segment, said reacted form of said one or more isocyanate species, combined with said reacted form of said one or more polyol or polyamine chain extenders or crosslinkers.

11. A low-adhesion coating containing a solventborne copolymer composition comprising:
   (a) a substantially continuous matrix containing a first component;
   (b) a plurality of inclusions containing a second component, wherein said inclusions are dispersed within said matrix; and
   (c) a solid-state lubricant distributed within said matrix and within said inclusions, wherein said solid-state lubricant is distributed uniformly throughout said coating,
   wherein one of said first component or said second component is a low-surface-energy polymer having a surface energy between about 5 mJ/m$^2$ to about 50 mJ/m$^2$, and the other of said first component or said second component is a hygroscopic material;
   wherein said low-surface-energy polymer is in the form of first soft segments comprising a fluoropolymer that is present in the triblock structure:

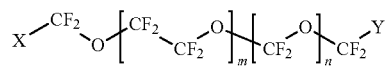

wherein:
X, Y=CH$_2$—(O—CH$_2$—CH$_2$)$_p$-T, and X and Y are independently selected;
p=1 to 50;
T is a hydroxyl or amine terminal group;
m=1 to 100; and
n=1 to 100;
   wherein said hygroscopic material is in the form of second soft segments comprising polyesters or polyethers, wherein said polyesters or polyethers are (α,ω)-hydroxyl-terminated and/or (α,ω)-amine-terminated;

wherein the molar ratio of said second soft segments to said first soft segments is 1.7 or less; and wherein said hygroscopic material is covalently connected to said fluoropolymer in a copolymer.

12. The low-adhesion coating of claim 11, wherein said solid-state lubricant is selected from the group consisting of graphite, graphene, molybdenum disulfide, tungsten disulfide, hexagonal boron nitride, poly(tetrafluoroethylene), fluoropolymers, and combinations thereof.

13. The low-adhesion coating of claim 11, wherein said solid-state lubricant is a plurality of particles coated with a metal selected from the group consisting of cadmium, lead, tin, zinc, copper, nickel, and combinations or alloys thereof.

14. The low-adhesion coating of claim 11, wherein said solid-state lubricant is characterized by an average particle size from about 0.1 μm to about 500 μm.

15. The low-adhesion coating of claim 11, wherein said continuous matrix further contains (i) one or more isocyanate species possessing an average isocyanate functionality of about 2 or greater, or a reacted form thereof and (ii) one or more polyol or polyamine chain extenders or crosslinkers possessing an average functionality of about 2 or greater, or a reacted form thereof.

16. The low-adhesion material of claim 15, wherein said isocyanate species are selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

17. The low-adhesion coating of claim 15, wherein said polyol or polyamine chain extenders or crosslinkers are selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N',N'-tetrakis (2-hydroxypropyl) ethylenediamine, and homologues, derivatives, or combinations thereof.

18. The low-adhesion coating of claim 11, said coating further comprising one or more additional components selected from the group consisting of a pigment, a dye, a plasticizer, a flame retardant, a flattening agent, and a substrate adhesion promoter.

19. The low-adhesion coating of claim 11, wherein said coating is characterized by a coefficient of friction less than 0.5 measured at 50% humidity and/or a coefficient of friction less than 0.3 measured at 90% humidity.

20. The low-adhesion composition of claim 1, wherein said molar ratio of said second soft segments to said first soft segments is from 0.1 to 1.5.

21. The low-adhesion coating of claim 11, wherein said molar ratio of said second soft segments to said first soft segments is from 0.1 to 1.5.

* * * * *